(12) United States Patent
Grinstein et al.

(10) Patent No.: US 7,734,607 B2
(45) Date of Patent: Jun. 8, 2010

(54) UNIVERSAL VISUALIZATION PLATFORM

(75) Inventors: Georges Grinstein, Ashby, MA (US);
Alexander Gee, Lowell, MA (US);
Urska Cvek, Shreveport, LA (US);
Howard Goodell, Salem, NH (US);
Hongli Li, Westborough, MA (US); Min Yu, North Chelmsford, MA (US);
Jianping Zhou, Acton, MA (US); Vivek Gupta, Littleton, MA (US); Mary Beth Smrtic, Westford, MA (US); Christine Lawrence, Waltham, MA (US);
Chih-Hung Chiang, North Chelmsford, MA (US)

(73) Assignee: University of Massachusetts, Boston, MA (US)

( * ) Notice: Subject to any disclaimer, the term of this patent is extended or adjusted under 35 U.S.C. 154(b) by 488 days.

(21) Appl. No.: 11/346,609

(22) Filed: Feb. 1, 2006

(65) Prior Publication Data
US 2006/0218563 A1    Sep. 28, 2006

Related U.S. Application Data

(60) Provisional application No. 60/648,918, filed on Feb. 1, 2005.

(51) Int. Cl.
G06F 17/30    (2006.01)
(52) U.S. Cl. ............... 707/705; 719/328; 707/E17.065; 707/E17.067; 715/848
(58) Field of Classification Search ................. 719/328; 707/1, 203, E17.065, E17.067; 703/6; 715/848; 345/419
See application file for complete search history.

(56) References Cited

U.S. PATENT DOCUMENTS

| | | | | |
|---|---|---|---|---|
| 6,731,314 | B1 * | 5/2004 | Cheng et al. | 707/E17.111 |
| 6,842,904 | B1 * | 1/2005 | Bartz et al. | 707/203 |
| 6,961,687 | B1 * | 11/2005 | Myers et al. | 715/727 |
| 7,062,475 | B1 * | 6/2006 | Szabo et al. | 707/E17.109 |
| 7,086,006 | B2 * | 8/2006 | Subramanian et al. | 715/747 |

(Continued)

OTHER PUBLICATIONS

F. Yang et al., "Data Exploration Combining Kinetic and Static Visualization Displays," *Proceedings of the 4th International Conference on Coordinated & Multiple Views in Exploratory Visualization* (London, UK, Jul. 4), IEEE Computer Science Society, pp. 21-30, 2006.

(Continued)

*Primary Examiner*—Mohammad Ali
*Assistant Examiner*—Thuy (Tiffany) Bui
(74) *Attorney, Agent, or Firm*—Fish & Richardson P.C.

(57) ABSTRACT

The invention relates to a framework system and methods for connecting a plurality of tools. The system comprises a plug-in mechanism configured to dynamically load the plurality of tools, a data pool having storage space configured to store data sets associated with the plurality of tools, a linking mechanism configured to establish communications links between the loaded plurality of tools to enable coordinated operation of the loaded plurality of tools, a session component configured to record the process history of the operations of the loaded plurality of tool and the system states corresponding to the process history of the operations and an annotation module configured to associate user-provided data corresponding to one or more of the stored data sets.

22 Claims, 12 Drawing Sheets

U.S. PATENT DOCUMENTS

2003/0167408 A1* 9/2003 Fitzpatrick et al. .......... 713/201
2005/0081105 A1* 4/2005 Wedel et al. .................. 714/38
2007/0118794 A1* 5/2007 Hollander et al. ........... 715/512

OTHER PUBLICATIONS

A.G. Gee et al., "Universal Visualization Platform," *Proceedings of the Seventeenth Annual Symposium Electronic Imaging Science and Technology* (San Jose, California, Jan. 16-20), vol. 5669, IS&T and SPIE, pp. 274-283, 200.

McCarthy et al., "Applications of Machine Learning and High-Dimensional Visualization in Cancer Detection, Diagnosis, and Management," Ann. N.Y. Acad. Sci 1020:239-262 (2004).

* cited by examiner

FIG. 4

UNIVERSAL VISUALIZATION PLATFORM

RELATED APPLICATIONS

This application claims priority from U.S. Provisional Application Ser. No. 60/648,918, entitled "Universal Visualization Platform," filed on Feb. 1, 2005, the content of which is incorporated herein by reference in its entirety.

BACKGROUND OF INVENTION

The present invention relates to methods and apparatus for visualizing, examining, and analyzing data. More specifically, the present invention relates to methods and apparatus for a universal visualization platform.

Development of a flexible, extensible, secure "architecture" for information-processing and visual analytic tools is needed to help analysts (e.g., users) and researchers collaborate more effectively and gain greater insight into the information space of concern. The architecture should provide a framework of standards, protocols, and basic utility functions into which new and innovative visual and analytical methods could easily be placed, used, and compared with other techniques.

Information visualization systems and toolkits are becoming available for a large range of visualization and interaction techniques and are used in diverse application domains.

SUMMARY OF THE INVENTION

The present invention provides methods and apparatus, including computer program products, for a universal visualization platform.

As described herein, in one aspect, the invention includes a framework system for connecting a plurality of tools. The system includes a plug-in mechanism configured to dynamically load the plurality of tools, a data pool having storage space configured to store data sets associated with the plurality of tools, a linking mechanism configured to establish communications links between the loaded plurality of tools to enable coordinated operation of the loaded plurality of tools, a session component configured to record the process history of the operations of the loaded plurality of tool and the system states corresponding to the process history of the operations and an annotation module configured to associate user-provided data corresponding to one or more of the stored data sets.

In some embodiments, the plug-in mechanism is further configured to automatically identify available tools from the plurality of tools, maintain a list of the connected plurality of tools, and load at least one of the loaded plurality of tools into memory. In other embodiments the data pool further includes an interface configured to retrieve, for example, a data set, table, view, join, graph, dimension, record, count, value, dimension type, and/or data type.

In yet some other embodiments the linking mechanism includes a memory structure for holding linked collections used to define coordination between loaded tools and data sets. The session mechanism maintains a memory structure with input/output functionality for maintaining the list of user events and system states supporting branching undo/redo history actions, replay history, and/or event/state saving.

In further embodiments, the user data provided to the annotation module includes, for example, text data, audio data, graphical data, and/or video data. The framework system further includes an application program interface configured to facilitate development of applications operable on the framework system. The application program interface is further configured to interface with the plug-in mechanism, the linking mechanism, the session component, and/or the annotation module.

In some embodiments, the framework system further includes a tool program interface configured to facilitate development of dynamically plug-in tools that can be requested and used by the application. The tool program interface is further configured to interface with the data sets, and/or linked collections.

In other embodiments the data sets are formatted as a table having rows representative of records of the data sets and columns representative of dimensions of the records. At least some of the dimensions of the table are configured to store data objects that are non-orderable, orderable, orderable based on measurable characteristics of the data objects, and/or orderable based on measurable differences between the one or more of the data objects.

In some embodiments the data sets further include metadata descriptors associated with one or more dimensions of data sets. The metadata records are configured to store descriptive information corresponding to the associated dimensions.

In further embodiments the loaded tools include data visualization tools configured to enable graphic interaction with data, data analysis tool configured to manipulate and modify the data sets, import and export tools configured to receive and transmits the data sets, and/or external interface tools configure to enable the framework system to communicate with other third-party applications.

In a another aspect, the invention includes a data versioning method for restoring data to an earlier state. The method includes recording an initial data set, performing a plurality of operations on the initial data set to produce a plurality of resultant modified data sets, each of the plurality of the modified data sets representing a corresponding version of the modified data set, recording in a log the plurality of operations performed on the initial data set, and re-generating one of the plurality of modified data set corresponding to a particular version of the data set by performing on the initial data set the sequence of operations recorded in the log that produced the one of the plurality of modified data set.

In some embodiments, the method further includes recording at least some of the produced plurality of resultant modified data set. In some embodiments, regenerating the one of the plurality of modified data set includes identifying from the recorded initial data set and the at least some of the recorded plurality of resultant modified data set the data set corresponding to the most recent version of the data set preceding the version corresponding to the data set to be re-generated, and performing the sequence of operations following the identified data set to re-generate the one of the plurality of modified data sets.

In other embodiments that method further includes recording system states corresponding to each of the recorded plurality of operations. Each of the system states includes an associated platform state and an associated tool state.

In another aspect, the invention includes a computer program product for restoring data to an earlier state. The computer program product is tangibly embodied in a computer-readable medium storing instructions that when executed on a processor cause the processor to record an initial data set, perform a plurality of operations on the initial data set to produce a plurality of resultant modified data sets, each of the plurality of the modified data sets representing a corresponding version of the modified data set, record in a log the plurality of operations performed on the initial data set, and re-generate one of the plurality of modified data set corresponding to a particular version of the data set by performing on the initial data set the sequence of operations recorded in the log that produced the one of the plurality of modified data set.

In another aspect, the invention includes a method for linking tools and data. The method includes identifying in a linking data record a relationship associating one or more tools with a data set, in response to an operation performed on the data in the data set, selecting the one or more tools identified in the linking data record, and causing the one or more tools to operate on the data set identified in the linking data record.

In another aspect, the invention includes a computer program product for linking tools and data. The computer program product is tangibly embodied in a computer-readable medium storing instructions that when executed on a processor cause the processor to identify in a linking data record a relationship associating one or more tools with a data set, in response to an operation performed on the data in the data set, select the one or more tools identified in the linking data record, and cause the one or more tools to operate on the data set identified in the linking data record.

In another aspect, the invention includes a method for displaying data. The method includes graphically representing, using a graphical object, characteristics of values of a data record, receiving data from an interacting user to alter the graphical object, performing operations on the graphical object based on the data from an interacting user, and causing the data of the data record to be displayed based on the operations performed on the graphical object.

In some embodiments the graphical object includes an anchor. In other embodiments the operations include overlapping interaction operator, avoidance interaction operator, switching interaction operator, bounded interaction operator, unbounded interaction operator, bounded group operator, and/or bound group and switching interaction operator.

In another aspect, the invention includes a computer program product for displaying data. The computer program product is tangibly embodied in a computer-readable medium storing instructions that when executed on a processor cause the processor to graphically represent, using a graphical object, characteristics of values of a data record, receive data from an interacting user to alter the graphical object, perform operations on the graphical object based on the data from an interacting user, and cause the data of the data record to be displayed based on the operations performed on the graphical object.

In another aspect, the invention includes a universal visualization platform. The universal visualization platform includes plug-in visualization and analysis tools, including at least one of: local plug-in tools, distributed plug-in tools, and Web-based tools, and model objects that store persistent internal states of the plug-in tools and framework components. The universal visualization platform further includes a session manager and a collection of View/Controller objects, including GUI "widgets" configured to record interaction steps, restore internal system components to a previously recorded internal state, and replay actions, and a graphical interface configured to display views of session history as standard platform datasets that may be visualized and interacted with using standard or custom tools such as a session graph tool that displays a graph of all prior computing system states and enables return to any selected state. And the universal visualization platform further includes a linked collection of tools that all access one or more datasets and update their views upon any dataset modification, datasets with persistent and versioned access to application data, and an annotation module for recording user comments and notes using text data, voice data, graphics data, and/or video data.

In another aspect, the invention includes a computer program product for visualizing data. The computer program product is tangibly embodied in an information carrier and is operable to cause data processing apparatus to instantiate a universal visual platform from an application. The universal visual platform includes plug-in visualization and analysis tools, including local plug-in tools, distributed plug-in tools, and/or Web-based tools, model objects that store persistent internal states of the plug-in tools and framework components, and a session manager and a collection of View/Controller objects, including GUI "widgets" configured to record interaction steps, restore internal system components to previously recorded states, and replay actions. The universal visual platform also includes a graphical interface configured to display views of session history as standard platform datasets that may be visualized and interacted with using standard or custom tools such as a session graph tool that displays a graph of all prior computing system states and enables return to any selected state, a linked collection of tools that all access one or more datasets and update their views upon any dataset modification, datasets with persistent and versioned access to application data, and an annotation module for recording user comments and notes using text data, voice data, graphics data, and/or video data.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The invention can be implemented to realize one or more of the following advantages.

A Universal Visualization Platform (UVP) fosters the development of integrated visualization techniques and data-mining algorithms by providing a flexible framework that supports such activities. The framework supplies a common foundation on which various visualization and analysis tools can be built.

The framework provides flexibility (e.g., tight coupling of multiple visualization and analysis tools for the exploration of multiple data sets), performance (e.g., size of data sets and speed of visualization), and linked high-dimensional visualizations and interactive tools (e.g., radviz, springviz, heatmap, and cluster comparison).

The framework provides a core functionality of an integrated visualization and analysis platform from which researchers can focus on the development of specific tools rather than the underlying infrastructure needed for such tools, as well as the development of applications using an application program interface (API) based on the defined framework.

The framework provides an infrastructure that supports dynamic plug-in tools—visualization, analysis, data exchange, and inter-process communication sub-programs. The framework provides API calls for specifying both multiple local and remote sub-program file locations. Tools are programmatically identified by specifying individual locations and are loaded by the application at runtime as needed by the user. Furthermore, sub-program files that change during runtime are automatically re-loaded using the most recent code, which supports the interactive development and testing of tools.

The framework provides an infrastructure that supports the monitoring of all activities within the framework. This allows observing, comparing, and learning from such activities, as well as statistical, machine learning, and other automated analysis. The framework provides the capability to store, reuse, explore as data, and analyze both the current user session and a context of previous sessions. The list of activities includes, but is not limited to, the collection of user exploration and knowledge discovery sessions, the computation of session metrics, the capturing of batch-executed runs of computations, and data mining experiments.

The framework can be written in any number of languages, including Java or C++, and executed in any one of a number of operating systems, such as Linux, Mac OS and Windows.

The framework is designed to deal with multiple very large data sets (e.g., thousands of dimensions and millions of records) and to display these in fractions of seconds for real time interaction on, for example, a typical personal computer.

The framework includes five main core components: a dynamic plug-in tool mechanism, a common shared data pool, a linking mechanism, an event recorder, and an annotation recorder.

The dynamic plug-in tool mechanism automatically identifies available tools, dynamically maintains the list of available tools, and loads requested tools.

The common shared data pool provides for the storage, access, and manipulation of multiple data objects.

The linking mechanism enables dynamic coordination between tools and framework objects (e.g., data structures and linked collections).

The event recorder captures user actions, and records system and data states in forms that support rapid restoration of any previous state in the session (sometimes called, "time travel"), viewing history as data, and replaying complete or selected action sequences into later sessions.

The annotation recorder supports the addition of user voice and text comments throughout an exploration process.

The framework supports four basic types of plug-in tools: visualization tools, analysis tools, data import and export tools, and external interface tools.

Visualization tools are defined as visual displays of information maintained within the framework's data structures (e.g., scatterplots, heatmaps, bar charts, pie charts, radviz, etc.).

Analysis tools represent statistical, machine learning, and other computational algorithms used to compute additional values about the available data or manipulate the available data structures (e.g., statistical summary algorithms, principal component analysis, neural networks, etc.).

The data tools are designed to exchange data between external sources and internal framework data structures. Import tools read external data sources and create appropriate data structures. Export tools access the available framework data structures and write to various external data sources. Data tools support the development of customized import/export tools for accessing proprietary data formats. Example data tools include comma separate flat-file data reads and writes, plus various database connection tools.

External interface tools provide access between core components and functionality provided indirectly via other mechanisms, such as connecting the framework to various commercial applications like SPSS Clementine™, R-project, and Weka. This allows developers to quickly link the framework to proprietary programs.

Enhancements to radviz and other spring-force based visualization tools support dynamic user manipulation and placement of dimensional anchors.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a schematic diagram of an exemplary embodiment of a data set table.

Like reference numbers and designations in the various drawings indicate like elements.

DETAILED DESCRIPTION

A visualization and analysis system can be divided into three major parts: a framework, an application, and numerous tools. The framework represents the functional core of the system providing the required objects and their relationships upon which applications are built and tools are integrated. Second, the containing application, a program that instantiates the framework, defines the system for exploring data. Finally, the application provides a set of tools, subprograms that perform specialized tasks either in response to direct interactions from users or indirectly, triggered by system components, other tools, or external programs.

Figure 1:
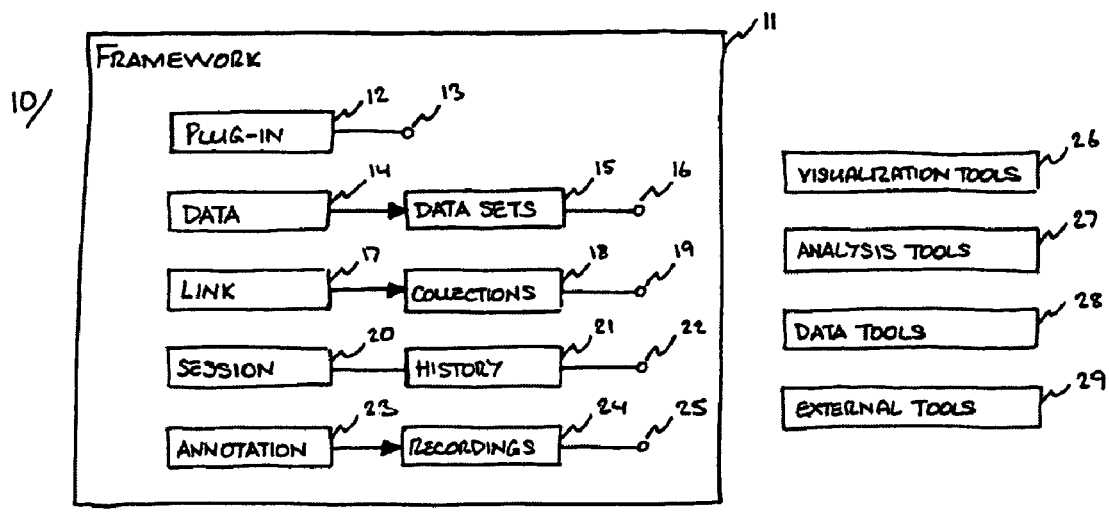
FIG. 1 is a schematic diagram depicting the components defining an exemplary embodiment of a universal visualization platform.

With reference to FIG. 1, a sample architecture of a system 10 is illustrated that defines core components of a well-rounded data visualization and analysis system, and indicating the system components, a number of managed objects, and different types of plug-in tools.

The system 10 includes a framework system 11 that can be defined by five system components: a dynamic tool plug-in mechanism 12, a common shared data pool 14, a tool and data linking mechanism 17, a user session 20 to capture events and states, and an annotation mechanism 23.

The dynamic tool plug-in mechanism 12 facilities tool development and sharing. The plug-in mechanism 12 is tasked with the identification of tools, the maintenance of the available tool list, and dynamically loading tools upon user requests.

First, the plug-in mechanism 12 is responsible for the identification of available tools from multiple user-specified local and remote file locations. Tools are identified using a naming structure, which includes both a organization package name along with the tool's specific name.

Second, the plug-in component is responsible for maintaining the list of available tools through a separate process or threads that watches for changes to the files and directories associated with individual tools; in this way, adding and removing tools from the directories results in a automated list modification. Furthermore, modified tool files can be loaded automatically for real-time programming development and testing purposes.

Finally, the plug-in component is responsible for dynamically loading the tool into memory for use either by the user or by other running tools. The dynamic loading of a tool entails the reading of the tool's file/s and making it/them available within the current process memory, either directly via the system or indirectly via a virtual machine. In the event that two or more tool names conflict, the tool with the more recent file date will be identified and loaded.

The plug-in component includes an interface 13 for other framework components and parent applications to request the list of available tools or load a specific tool into memory.

The data pool 14 provides a common shared space for multiple dynamically linked data sets 15. Data sets 15 are defined as memory structures for storing data, which is written to and read from by the various tools, which can be organized as tables, views, joins, and graphs. Data sets 15 then becomes placeholders for data, collections of observations and values.

Data sets 15 supports the specific data types integers, longs, floats, and doubles—both 32-bit and 64-bit numbers for data consistency and precision—along with dates, universal resource locators (URLs), and arbitrary strings or symbols. Data sets 15 provide support for storing arbitrary objects permitting storage of more complex structures, such as chemical structures, graphic icons, and entire abstract application objects.

In addition to data types, data sets 15 include a concept of dimension type, the characterization of how values relate to each other within a single dimension. Four dimension types or scale measures are nominal, ordinal, interval and ratio. Nominal refers to objects that have no natural ordering. Ordinal implies orderable objects, for example days in the week. Interval defines orderable objects with inherent measurable interrelationships. Ratio includes the notion of zero and the concept of measurable differences between values. Data sets 15 provide initial recommendations for dimension types based on the underlying data and users can change these types as necessary throughout the analysis process. Furthermore, the dimension types as first class objects provide access methods to customize the mapping of objects within each dimension.

All tools built using this framework share a common data access interface 16, the function of which includes add/get (i.e., retrieve) data set, add/get table, add/get view, add/get join, add/get graph, add/get dimension, get dimension count, add/get record, get record count, set/get value, set/get data type, set/get dimension type, etc.

The linking mechanism 17 defines coordination between collections 18 of tools and associated data sets individual tools are accessing. Coordination define the communication mechanisms by which tools work together to display related information, defined as the sharing of parameters and variables via the linked collections 18 for different data sets.

Linked collections 18 are maintained by the application based on predefined coordination structures or user-defined tool interactions. Individual tools are added by the application to specific linked collections 18 in order to share parameter settings and data view or selection states. Tools are responsible for creating and passing on events to their associated linked collections 18 based to respond to parameter and state changes.

A common linked collection interface 19 is provided to support applications and tools. This interface 19 performs operations to add/get tools, post/receive change events, set/get dimension selections, set/get record selections, set/get parameters, etc.

The session component 20 is responsible for capturing the process history 21 of both user interactions and system states. Embodiments of the implementations of session component 20 enables the framework 11 to return directly to any prior state, providing generalized undo and redo of actions, including all branches caused by returning to previous states and taking different actions. The implementations also facilitate the visualization and analysis of such interactions and sessions by treating history 21 as a data set, such as one of data sets 15. Sessions are recorded permanently and may be replayed in future sessions, even where they themselves included the replay of prior sessions.

User session histories provide applications with a programmable interface 22, which enable applications with session mechanisms to open, playback, restore, jump-to and rewind history.

The annotation module 23 is responsible for capturing user and system defined recordings 24 that provide additional information about the exploration process as text, image, audio, and video captures associated with the current system state maintained by the session component 20. The annotation module 23 is significant in that it provides a mechanism for users to vocally add comments and observations using voice or video recording 24, which can be converted to text or closed-caption. The use of voice to annotate the exploration process frees up the user from context switching between exploration and understanding data to documentation of the process and indicating interesting observations. Furthermore, by converting voice recordings 24 to text and associating them with user's session history 21, a user can query past recordings 24 using key words and phrases to identify similar observations and annotations 24.

The annotation module 23 provides a programmer's interface 25 for adding, querying, and fetching recordings 24.

Applications and tools are built on top of the framework. While the application instantiates, owns, and initializes the framework, it is the tools that actually use the framework to perform their tasks. Applications come in two types, those generated for domain-specific analyses of known data sets with associated tools, and others written for more general purpose discoveries from assorted data sets using a variety of tools. Both are based on a central framework and part of a single common architecture. Likewise, tools can be domain-specific or generic. When all tools work with the same underlying data model, then specialized tools created for one domain can potentially be used within other domains that support similar data characteristics.

Figure 2:
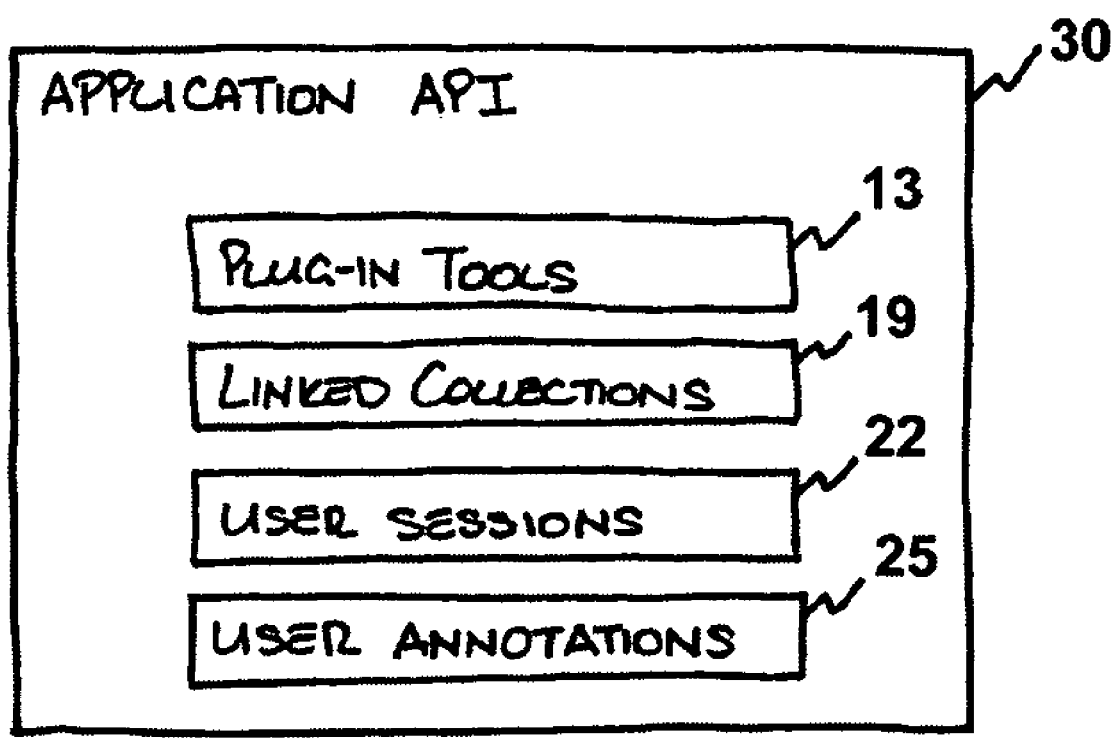
FIG. 2 is a schematic diagram showing an exemplary embodiment of an application's interface to the framework components of FIG. 1.

As shown in FIG. 2, the framework 11 provides a basic application program interface 30. The application program interface 30 is configured to facilitate development of applications that are based on the framework 11; thus providing the application with all the functionality of the framework 11. The application program interface 30 enables custom access to four of the framework 11 components, including plug-in tools 12 to request tools and the available list of tools through the plug-in interface 13, linked collections 18 to define coordination between collections of tools and data via the linked collection interface 22, user sessions component 20 to work with exploration histories 21 via the history interface 22, and user annotations 23 to enable the addition of recordings 24 via the recording interface 25.

Figure 3:
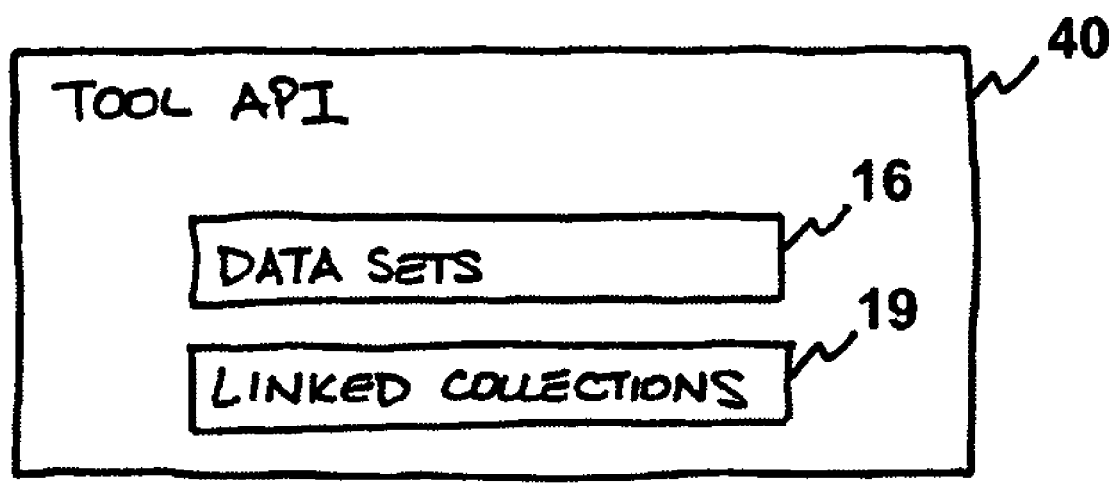
FIG. 3 is a schematic diagram depicting an exemplary embodiment of a tool's interface to the framework components of FIG. 1.

As shown in FIG. 3, the framework 11 also includes a basic tool program interface 40. This tool program interface 40 facilitates development of specific tools for use with the applications developed using the application program interface 30. The tool program interface 40 enables access to two of the framework 11 components including, the data pool 14 to access and manipulate data sets 15 via the data set interface 16, and the link component 17 to work with other tools within a linked collection 18 via the linked collection interface 19.

With reference to FIG. 1, the framework 11 includes a common shared data component 14 that supports multiple dynamic and linked data sets 15. Along with the support for very large data sets 15, this data component 14 supports version control of data sets 15 to support history 21 events that return the system to any prior state.

Figure 4:
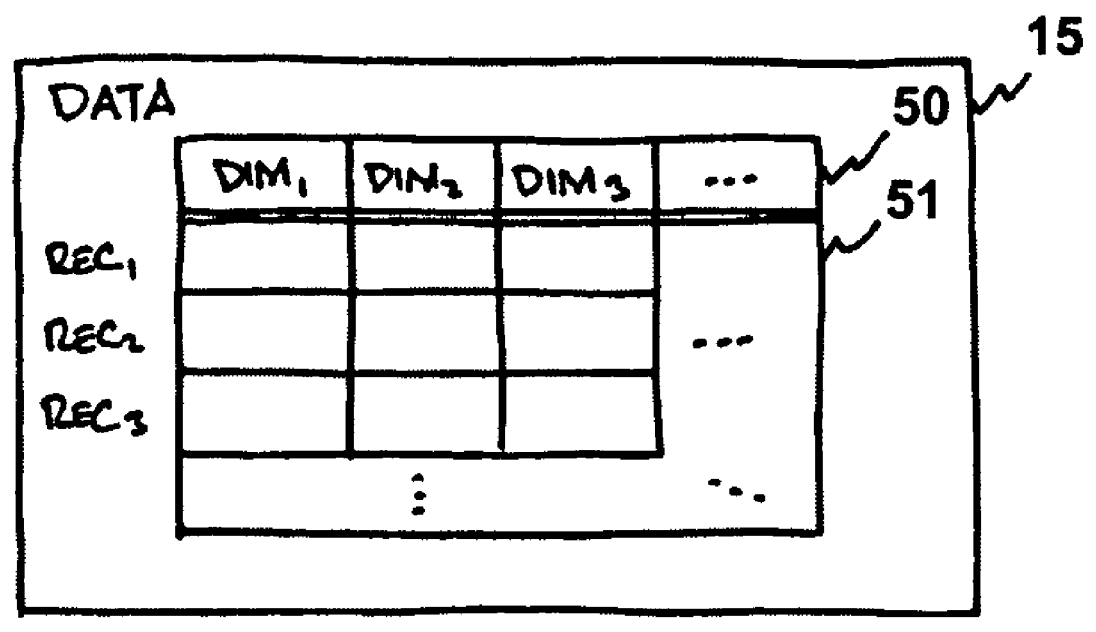

With reference to FIG. 4, data sets 15 are formatted as a table that contains multiple dimensions 50 (columns) and records 51 (rows), similar to a spreadsheet or database table. Data in data sets 15 are added and received through the data set interface 16.

Figure 5:
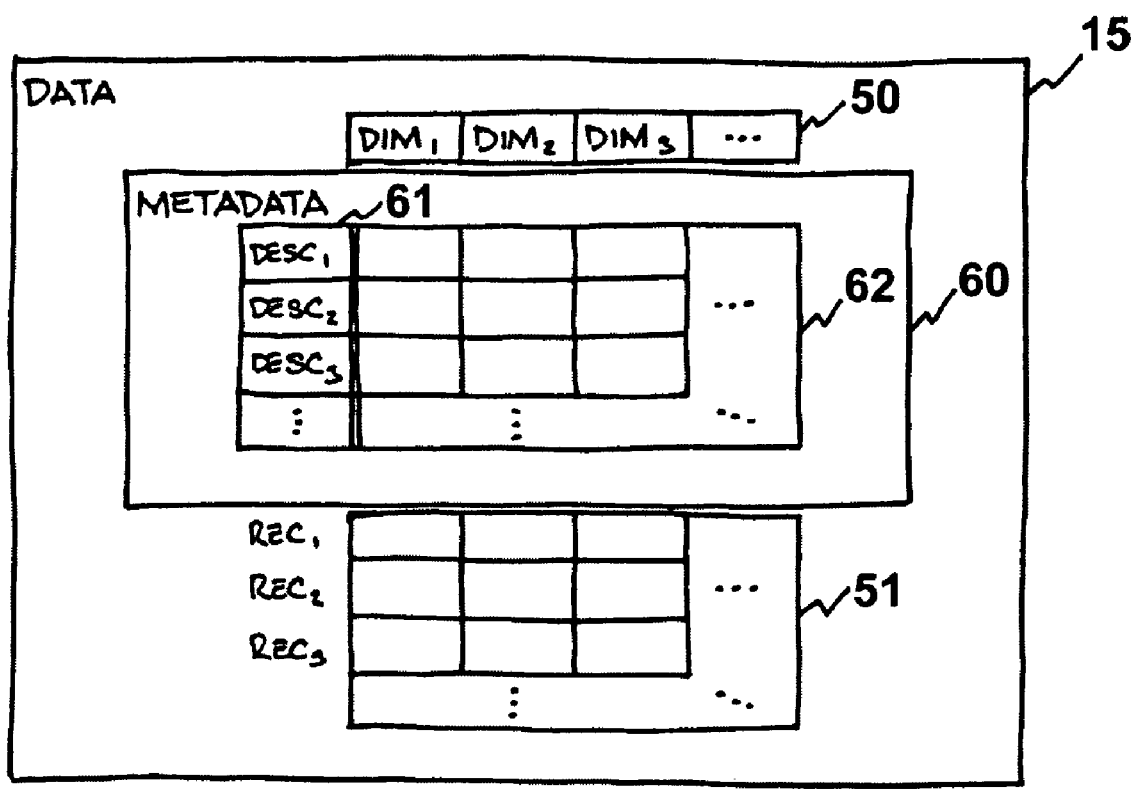
FIG. 5 is a schematic diagram of an exemplary embodiment of a data set table with a metadata table.

As shown in FIG. 5, data sets 15 support an additional type of information called "metadata," which provides supporting descriptions about the records 51 and the records' dimensions 50. Metadata about records 51 can be added by including additional dimensions 50 within the original data sets 15. In contrast, metadata about dimensions 50 requires extending standard data sets 15. Metadata 60 can thus be defined as an additional data set 15 formatted so that its dimensions 61, referred to as descriptors, are the same as records 51 of the original data sets 15. The records 62 of the metadata 63 map to the dimensions 50 of the original data sets 15. Descriptors 61 describe individual dimensions 50 and how they relate with each other. Like dimensions 50, a descriptor 61 includes a unique name, a data type, and maintains a dimension type.

An analysis of data involves the linking of multiple data sets in order to provide a richer data set from which to analyze. Within the framework 11, multiple data sets 15 are linked together by standard database joins or merged as grouped observations directly in memory. This addition greatly extends the possibility of incorporating additional supporting information during a data discovery exploration session. There is no need to construct the joins outside of the session and restart the session. For example, an analysis of census data might require pulling in a geographic map and thematically mapping political boundaries by group counts.

Another important aspect of data sets 15 are their support for dynamic operations and the generation of data modification events. Actions performed on one or more of the data sets 15 by direct manipulation from the users or indirect updates via an algorithm result in an automatic data event. Data sets 15 lend themselves to supporting dynamic streaming data sources. Hence, stream visualizations are easily supported.

Data sets 15 support persistent data values via a versioning mechanism, making data modification operations nondestructive, necessary for history rewind operations. Previous versions of data may be quickly restored, making real-time undo and redo operations feasible, even for actions that are computationally expensive. To prevent data sets 15 from continuous versioning and dynamic updating during extensive sequence of data modifications via the data set interface 16, a data set write-lock mechanism can be provided that encapsulates an entire sequence of data set updates into a single data modification event.

A major reduction in data storage between sessions is achieved by discarding most intermediate data storage when a session ends. The permanent log primarily records initial user actions, not the resulting changes to data. Logs (contained, for instance, in local files, database tables, or on Web servers) are read into a future session by repeating the user actions, including opening the original versions of its datasets. This procedure naturally re-generates all the intermediate data of the past session(s), without needing to save them permanently.

As an optimization, some intermediate results may be saved where the operations that generated them were time-consuming. Later sessions can simply use the saved results instead of repeating the observations. These mechanisms can be applied automatically based on the time operations require, with exclusions for operations that must be repeated because, for example, they depend on time-changing data.

Other strategies may be employed where it is not feasible or desirable to maintain full version histories. Data versioning may be limited to periodic checkpoints. In this case "time travel" to steps in between them is performed by returning to the last prior checkpoint and replaying actions forward to the desired point. Data versioning may also be turned off entirely or limited to a representative sample of data and/or a metadata summary. One such situation would be when working with time based data windows into streaming data sources that do not fit in memory. After each interval, a time-stamped version will still be defined but not stored. Users can analyze the data and metadata saved during such sessions as usual, and restore system state for the elements that were saved; however, the data they view after returning to prior states will not be fully correct.

Thus, data sets 15 capture the main features of existing information visualization and analysis systems in addition to providing additional functionality. Framework 11 supports multiple linked dynamic data sets 15 with automatic versioning, definitions for data and dimension typing, tree and graph wrappers, as well as dimension metadata using descriptors 61. Such data sets 15 provide for a well-rounded and flexible framework 11.

With reference again to FIG. 1, the framework 11 includes plug-in tools components 26, 27, 28 and 29 that are easily shared and integrated. The plug-in tools component 26, 27, 28 and 29 are dynamically discovered and made available from multiple local and remote directories.

Visualization and analysis applications can include a collection of precompiled tools, visual and analytical subprograms designed to perform specific data analysis tasks. Most systems that support the integration of custom tools require compiling the new tools into the main application or registering the new tool with the application, neither of which is typically a straightforward activity. Web services are a step towards sharable tools across the global internet or local intranet; however, web services also require some setup procedures. The mechanism employed in this framework 11 provides research scientists an easier way to develop and share their tools with colleagues, a process that does not interfere with the discovery task or development work.

Plug-in tools 26, 27, 28 and 29 are supported by tool templates which define required interfaces and include specific functionality appropriate to classes of tools. These templates include data visualization tools 26, data analysis tools 27, data import and export tools 28, and external interface tools 29.

Data visualization tools 26 provide graphical displays of data sets and allow operators to interact with data graphically. These tools 26 include both classic visualizations like scatterplots, line charts, bar graphs, as so forth, as well as more modern techniques such as heatmaps, Parallel Coordinates, RadViz, and so forth. In addition to the standard visualization tool template they extend, these tools 26 provide additional functionality as needed, such as layered displays, graphical annotations, selection mechanisms, and other common components provided by the framework 11.

Data analysis tools 27 provide computational support for the manipulation and modification of data values. These tools 27 apply various statistical, machine learning and data mining algorithms, and numerous data manipulation procedures including data normalization, filtering and searching techniques.

A separation of data display and data manipulation tools is preferred and fundamental in the platform, separating the algorithms applied to modify data from the techniques for displaying it. In this manner it is possible to substitute other analysis algorithms while still using the same display, or vice-versa. For example, most existing implementations of Principal Components Analysis (PCA) automatically display their results in a two- or three-dimensional scatterplot. However, the scatterplot is just one of many visualization tools able to display the results of the PCA. Likewise, the display of a graph is no more than a scatterplot of nodes connected by edges laid out using a graph layout algorithm, of which there are several to choose.

There are data import and export tools 28 that are designed to read in and write out data sets, connect to databases and return queries and communicate with streaming data sources. Like all tools, data import tools 28 can define public dimensions that allow any linked tool to modify the stored data values. However, unlike other tools, data import tools 28 have the functionality to define dimensions that are visible to all other linked tools in a read-only state. This permits the insertion of dimensions specified not to maintain persistent data, since the values are generally changing and should not be stored (as in the example of streaming data sources).

External interface tools 29 provide connections between platform based applications and other independent applications enabled via any number of data exchange mechanisms. These tools 29 provide connectivity to other public and commercial software packages.

The framework 11 includes the link components 17 that can dynamically link tools together based on linked collections 18. Changes or events made in one tool can be seen in another linked tool. For example, selection of records and brushing in one tool can be observed in other linked tools. The framework 11 supports multiple linked collections and tools belonging to multiple linked collections.

Most interactive visualization environments support the minimum of one coordination—the linking of multiple visualizations in such a way that the interactive selection of records in one linked visualization results in the highlighting of the same set of records within the other visualizations. The framework 11 generalizes support for the linking of multiple visual and analytical tools. Furthermore, for increased flexibility, the framework 11 maintains multiple linked collections 18 supporting a generalized space of applications.

Linked collections 18 provide more than just a relationship between tools: they also define relationship between tools 26, 27, 28, and 29 and the data sets 15. Linked collections 18 are intrinsically associated with a data set 15, and tools 26, 27, 28 and 29 using a data set belong to the associated linked collection 18. Linked collections 18 also define relationships between data sets 15, including joining or merging. Thus, unlike conventional systems, there is no direct relationship between tools 26, 27, 28 and 29 and data sets 15, but rather the linked collection 18 is used to enable the generation of two or more independently linked set of tools 26, 27, 28 and 29 that can observe a common underlying data set 15, while from the tools point of view they perceive only the idea of one data set 15.

Thus, the linked collections 18 are encoded as a data set stored on data sets 15. Not only does this approach provide a more consistent access to multiple linked collections 18, but it also enables the direct visualization and analysis of multiple linked collections 18. Given that data sets 15 support dynamic events, views of the linked collections 18 are thus automatically updated.

The framework 11 includes user sessions 20. The framework 11 provides for the monitoring of user actions and records them for both undo/redo of actions and session analysis purposes. Recorded histories 21 can be replayed for demonstration, education, and validation, or analyzed and visualized to study and share process steps.

Most previous visualization and analysis systems that include support for the undo and redo of user actions use a one-dimensional command stack approach that provides only linear access to the user's actions. However, a command stack lacks the capability to handle branched undo and redo sequences. In the most obvious case, branches occur in a command history when a user performs one or more undo actions and then continues to interact with the system in a way not equivalent to the next stored redo command. Branching histories result in history trees or graphs rather than linear stacks. Systems that use the "command stack" approach discard their record of the previous branch, making those states inaccessible, but this system retains them, using visualizations such as a session graph to allow users to view and return to them. The framework 11 also supports user actions coming from multiple instances of a tool opened on a single dataset, as well as actions in tools opened on multiple data sets.

To support the visualization of and interactions with action histories, the platform 10 encodes histories of user actions and system events as datasets with our data model. This approach makes all the resources of the framework 11 applications and tools available for analyzing and comparing sessions. Sessions thus become much more valuable resources for learning, predicting, recommending and evaluating the data exploration process. It is to be noted that just as linked collections stored as a dataset are dynamically updated, the generation of events automatically updates tools currently viewing the user session's history.

The framework 11 provides the capability to save the user's current analysis session. Depending on user preferences this can be a snapshot of the system state with all the various parameters and data sets, or entire user session, including the complete session history and associated data. Saved sessions can be reopened later to continue the discovery process from the last saved point, to replay or animate the session for demonstration or educational purposes, or more interestingly to analyze and compare user sessions.

As described above, the framework 11 includes a central framework and a large number of plug-in tools. Major common functions such as managing data and coordinating between tools are incorporated in the framework 11, while the specific functionality of individual visualization and analysis tools is "plugged in" at runtime. Because these tools are written by different individuals and institutions, the architecture is configured to minimize the work that the writer of a tool must do for its actions to be recorded. Relevant platform features for this function include a session manager that tools call to record each interaction step, a session graph tool that displays a graph of all prior system states, and allows the operator to select any state to return to, linked collections of tools that all see the same dataset, and update their views whenever any one of them modifies it, datasets with persistent, versioned access to all application data, and tool state objects that store tools' internal states at every step.

The session component 20 of the framework 11 automatically logs information about each user action, including the attributes or data changed, the time, and the tool instance in which it occurred. The session component 20 pulls out or calculates additional data (for instance, the operation identifier objects have an operation classification attribute which is useful for analysis), and adds system information such as time between operations. The session component 20 records the data in forms that may be viewed as standard datasets. These datasets may be explored with the built-in Session Graph Tool, and also opened like any other data by standard platform visualization and analysis tools.

Besides the data which is explicitly available for analysis, a large amount of other information is maintained to restore any arbitrary state of the session. Two kinds of session state need to be recorded: data state, which is maintained transparently by the datasets, and tool state, which is maintained by the tool's Model objects. Both of these provide persistent data and data versioning. Therefore the session component 20 only needs to keep a record of which versions are current after each user action, to be able to restore the data to that state in the future.

Data sets 15 hold the data which all platform 10 tools manipulate and display. They present a common interface to data whether it is maintained in databases, read from files, or streamed.

Tools and other system components contain a single object that maintains their persistent internal state or Model Each of their attributes that contains state information; i.e. information which is neither transient nor part of the data it manipulates, should be incorporated in the Model rather than directly in the tool or component. Examples of such persistent state data for a visualization tool include the currently-selected mappings of data dimensions to display axes or data to visual properties.

These Model objects keep a record of their states at each point in the session, and can restore them to their values at any previous time. One implementation of these Model objects uses the Memento design pattern. A Memento pattern object stores an internal state of the originator object. The Memento may store as much or as little as the originator's internal state as necessary at its originator's discretion. The Memento protects against access by objects of other than the originator. Mementos have effectively two interfaces. A caretaker sees a narrow interface to the Memento—it can only pass the memento to the other objects. An originator, in contrast, sees a wide interface, one that lets it access all the data necessary to restore itself to its previous state. Ideally, only the originator that produces the memento would be permitted to access the memento's internal state.

An alternate implementation is to create a Memento for individual persistent attributes in a Model object; so that each attribute manages the history of its own prior states. This adaptation allows strategies to be applied to reduce the data stored, such as "reverse delta" storage, in which only the changed components are stored on each step.

Every Model object in this design can be viewed as a standard Universal Visualization Platform (UVP) dataset. This dataset may have a column (dimension) for every attribute, or for groups of related attributes. It may have a row (record) for every unique state—every point in time at which any attribute or data element changed, or for every user action (which may cause changes to multiple system attributes and take some time to complete), or for groups of user actions such as multiple changes to a graphical slider widget that result in a single change to the value it controls. Data presented in these dataset views may be stored in standard datasets, in external databases, or supplied by all the originator objects that retrieve it from their Mementos for the appropriate time point.

A Model may include other Model objects that belong to sub-components of its tool or internal system component. The system design includes graphical "widgets" and property panels that contain their own Model objects. The platform design includes a mechanism for composing summary Models and Model dataset views that recursively include all the persistent attributes of their components. This method may also be used to create overview dataset views of the state of large parts of the system, or the whole system, for some or all of the session.

The system design includes the creation of Proxy objects that reflect the changes to one or more real attributes. Dataset views of these proxies may include, for example, all attributes with a given taxonomic classification, or a single attribute in multiple tool instances.

The definition or registration process may permit tool designers to apply a standard category to each attribute. The platform documentation includes a taxonomy of data exploration actions to supply these categories. Actions in the system are labeled by the taxonomic categories of the attribute(s) they modify. No previous information visualization and analysis system has automatically applied this kind of precise and comprehensive classification for user actions.

Using these taxonomic categories makes the evaluation of actions more precise. For example, when users return to previous states, the implications may be different depending upon whether the attributes they are modifying have to do with basic selection and analysis of data, or colors and fonts. In the first case, they are probably confused or searching for new patterns in the data; in the second, they are optimizing the presentation of what they have already found.

The state after each user action or internal analysis step becomes a vertex of the history graph that the analyst can return to. At these points, the system evaluates and saves the states of its registered attributes. Datasets also have their own persistency and versioning. Therefore to generate a complete record of the state of a dataset and all the tools linked to it (its Linked Collection), the Session Manager simply needs to record the version of the dataset and prompt each linked tool to update and return its current state version.

Similarly, to return the dataset and its tools to any prior state, the Session Manager simply needs to command the dataset and each tool or internal component with persistent state to return to a prior condition. The tools retrieve the designated version of their state attributes from their Model objects, and update their displays for the data, selected points, and exact view settings of each tool to be restored.

A possible implementation for Tools and other system components to return to a previous state is to send a Visitor design pattern to their components recursively. The system design includes a dual hierarchy of Model and View/Controller components, and a procedure for Visitor-pattern objects that first restore all the Model elements to their previous state recursively, and then secondly update all the View components to match. This procedure solves the problem of one View/Controller object whose appearance and response depends on the state of other components. For example, a widget that selects a data dimension to map to the color of displayed objects may not appear or respond to user commands if a different widget has made the color fixed. This system's procedure of restoring all the Model attributes first is essential for the correct restoring of the View appearance and Controller behavior of the individual widgets.

The session tool is a custom interactive graph display with a variety of functions. Because it normally views the data of the current session history, it updates after every action in the interface. To keep a stable reference for the analyst, it only redraws as much as necessary. Larger updates are necessary when the graph adds a fork because the operator returns to a previous state and then takes different actions.

When the user hovers over a node in the Session Graph, descriptive details are displayed in a panel at the side. Additional graph edges in and out of that node are displayed that are not normally drawn (to avoid visual clutter.) As they are hovering over a point in the saved session graph, the operation by which the point was originally entered is displayed. The hover display shows additional edges that are not normally shown: additional in-edges (by direct selection or manually returning to the same state) shown in one color, and additional out-edges shown in another color, for example.

The session component 20 supports a generalization of the undo/redo functionality. As noted above, conventionally the undo/redo is implemented as a linear stack. If the user takes a different action, the rest of the redo actions can no longer be accessed. In the framework 11 session graph, the user may click on any node and restore the system state to what it was when that node was recorded. The change is propagated to all tools linked to the dataset, so they all redraw themselves with the old state. Then if the user takes other actions, the graph adds a branch at that point. They may still return to any point they have visited.

Visualizing and interacting with session histories 21 has many practical benefits. The benefits of undo/redo are greatly enhanced by representing history as a graph, all of whose branches remain accessible. Interacting with a visible history of their actions augments the analyst's working memory.

Viewing and re-exploring past session histories 21 can allow an analyst to locate and reproduce successful sequences of operations that might otherwise be forgotten. Session histories become a representation of techniques otherwise implicit in one analyst's memory, that their colleagues can discuss, critique, and learn from. Just as researchers make their raw data available to support the results in a publication, they could also post records of the exploration they performed, allowing their colleagues to re-trace their discovery process and possibly extend it. Experienced users can annotate their histories as tutorials for new users. Just as textbook authors post supplemental material on websites, their examples and exercises and solutions could include portions of a discovery process the students can retrace and build on.

Many tools such as GNU Emacs or Microsoft Office applications let users turn on a recording function and then create a "macro program" by demonstrating a sequence of actions. This framework lets users create macros after the fact, by selecting actions from a graphical history. This is easier and more accurate than trying to perform a sequence of actions exactly.

Visualization tool designers can find what aspects of their products are difficult to learn or use by analyzing the actions of many users. They can also create libraries of "motifs" or common patterns that may be distributed as common macros or converted to system operations to make their system more efficient and useful.

Records of data exploration actions have many other uses. For example, organizations can verify to regulatory authorities that specified steps were followed in evaluating clinical trial data or investigating forensic evidence. Vendors and customers can perform regression tests on visualization software. Organizations can answer questions about an analysis long after it is performed, e.g., whether a bug in a piece of analysis software compromised an evaluation used for regulatory compliance.

An extension of the radviz and other spring-force based visualization tools includes the support for dynamic interactive dimensional anchor manipulations. Radviz and other spring-force based visualization techniques can be defined as a plug-in visualization tool, defined by P. Hoffman, G. Grinstein, K. Marx, I. Grosse, and E. Stanley (1997) *DNA Visual and Analytic Data Mining* in J. Dill and N. Gershon (Eds.), *Proceedings of the IEEE Symposium on Information Visualization* (Phoenix, Ariz., October 19-24), IEEE Computer Society Press, pp. 437-441, the content of which is hereby incorporated by reference in its entirety. A "dimensional" anchor is a graphical representation (e.g., point, circle, triangle, line, etc.) of a dimension from the underlying data set. The anchor provides a connection between a spatial position within the display, more specifically within a 2D or 3D visualization display, and a dimension or column a data set. The anchor is used to specifying exactly how and where data dimensions are used to render a visualization display. Radviz can thus use an arbitrary number of anchors for its visualization rendering. By grasping a hold of an anchor (or more particularly, its underlying dimension) and subjecting it to certain operations based on user interaction, the anchor can be moved to dynamically change the visualization projection of data onto the screen.

Earlier radviz visualization techniques defines a fixed circular arrangement of dimensional anchors, graphical representations of dimensions 50 of data sets 15. Records 51 are represented as additional graphics and positioned within the arrangement of dimensional anchors based on physical mechanics of virtual springs, which are attached between each record 51 representation and all dimensional anchors. The pull or spring-constant of each virtual spring equals the data value for each record 51 and dimension 50. Record 51 representations are "pulled" more towards those dimensional anchors with greater dimension 50 associated values. These visualizations may or may not include dimensional anchors for all dimensions 50 within data set 15.

As described herein, radviz and other arrangements of spring-force based dimensional anchors are extended to support dynamic dimensional anchor manipulations through user interactivity. Four interaction operators applicable for working with individual selected dimensional anchors and three group operators applicable for manipulating multiple selected dimensional anchors are defined. Selection of dimensional anchors is performed either directly by the user clicking and dragging a computer input device (e.g., mouse, pen, etc.) to highlight the graphical representations of dimensional anchors or indirectly by the system algorithmically highlighting dimensional anchors. The manipulation of dimensional anchors is performed by clicking and dragging the highlighted selected dimensional anchors using a computer input device (e.g., mouse, pen, etc.).

Figure 6:
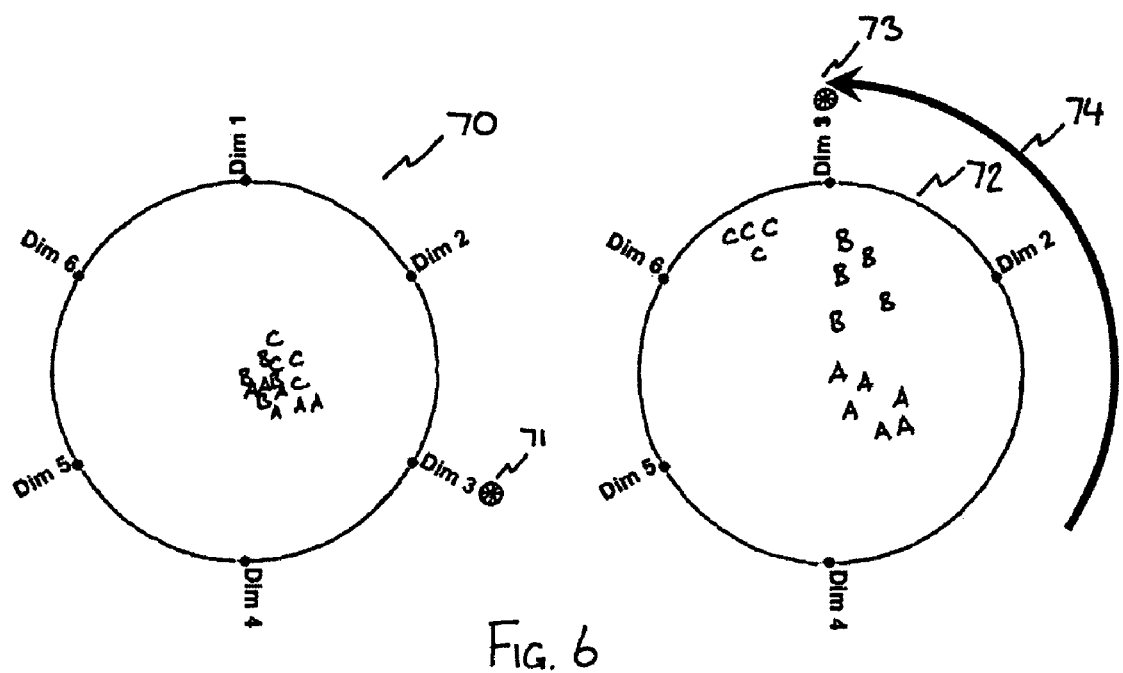
FIG. 6 is an illustration showing the results of using an overlapping interaction operator on a radviz tool.

FIG. 6 shows the results of dynamically manipulating a single dimensional anchor 71 within a constrained radviz tool 70 using the "overlapping interaction operator" in which dimensional anchors can overlap other anchors. The original radviz 70 of six dimensions transforms into the customized radviz 72 during user interactive dragging of dimensional anchor 71 in the original radviz 70 to dimensional anchor's 73 position in customized radviz 72 through the arc 74.

Figure 7:
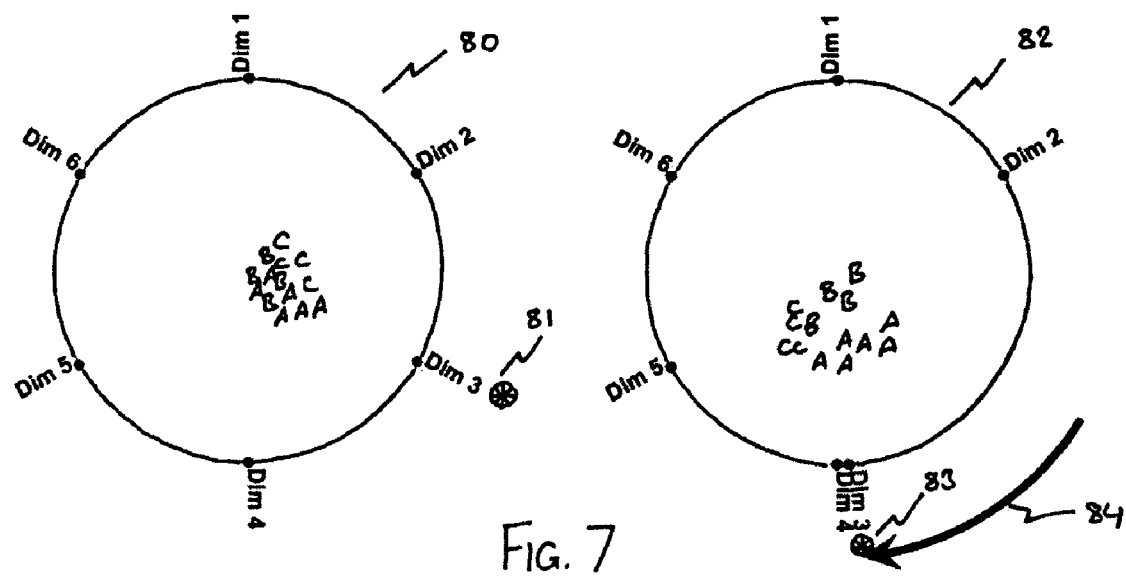
FIG. 7 is an illustration showing the results of using an avoidance interaction operator on a radviz tool.

FIG. 7 shows the results of dynamically moving a single dimensional anchor 81 within a constrained radviz tool 80 using the "avoidance interaction operator" in which dimensional anchors are not permitted to overlap unselected anchors and are required to map to unique display space locations. The original radviz 80 of six dimensions transforms into the customized radviz 82 during user interactive dragging of dimensional anchor 81 in the original radviz 80 to dimensional anchor's 83 position in customized radviz 82 through the arc 84.

Figure 8:
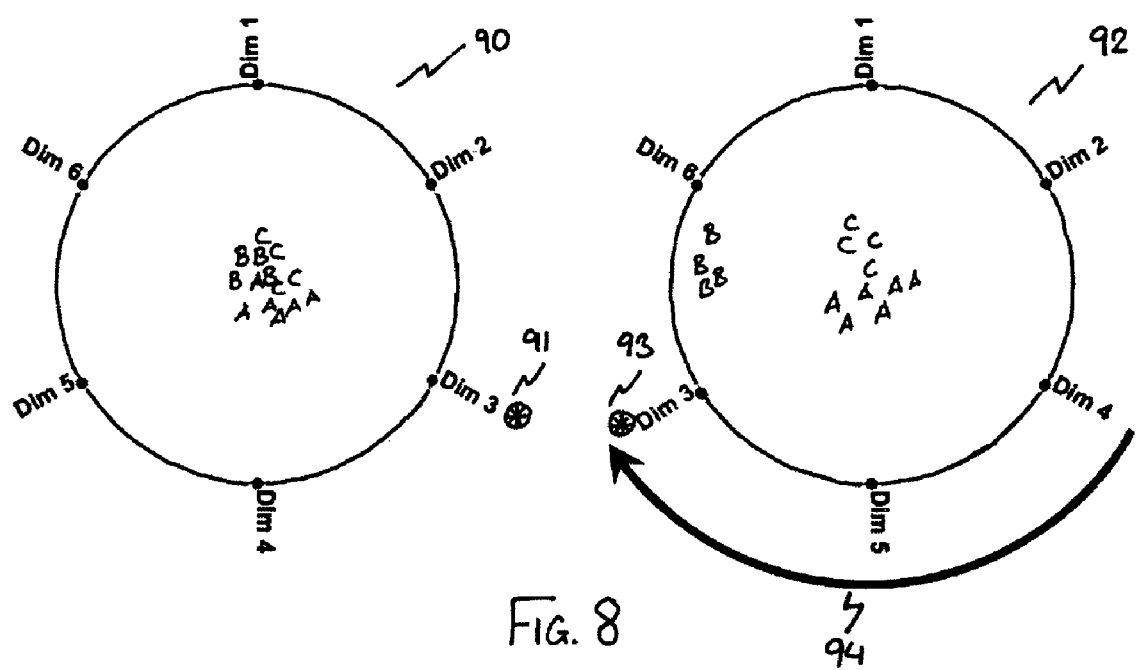
FIG. 8 is an illustration showing the results of using a switching interaction operator on a radviz tool.

FIG. 8 shows the results of dynamically moving a single dimensional anchor 91 within a constrained radviz tool 90 using the "switching interaction operator" in which dimensional anchors is executed by switching selected dimensional anchor positions with unselected dimensional anchors in the direction of user control. The original radviz 90 of six dimensions transforms into the customized radviz 92 during user interactive dragging of dimensional anchor 91 in the original radviz 90 to dimensional anchor's 93 position in customized radviz 92 through the arc 94.

Figure 9:
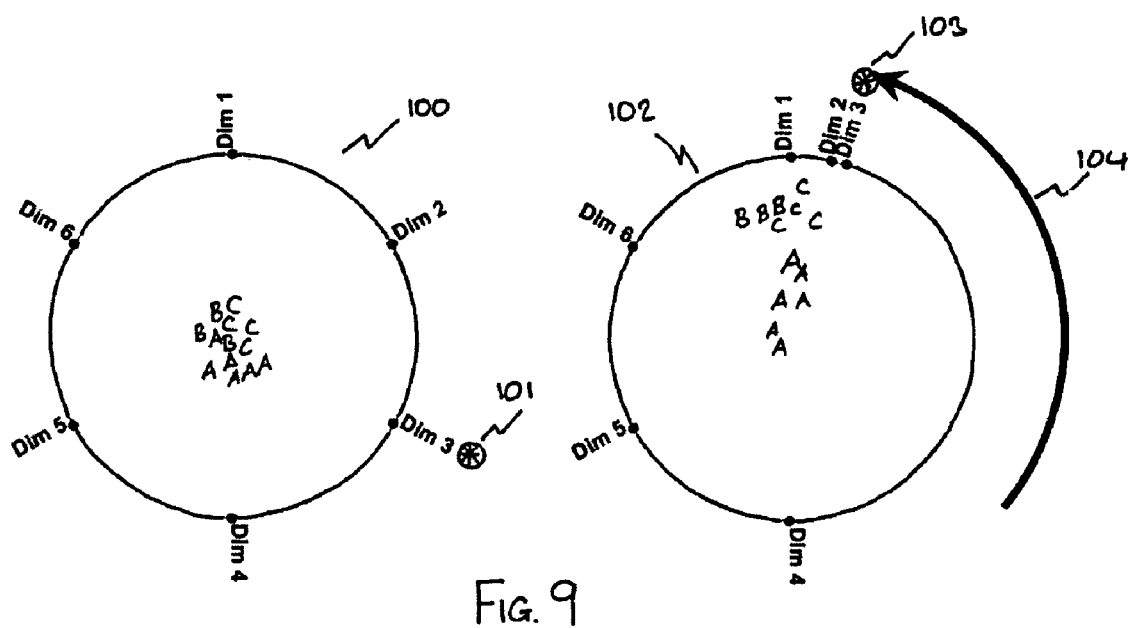
FIG. 9 is an illustration showing the results of using a bounded interaction operator on the radviz tool.

FIG. 9 shows the results of dynamically moving a single dimensional anchor 101 within a constrained radviz tool 100 using the "bounded interaction operator" in which the ordering of the dimensional anchors does not change, consequently, movement of a selected dimensional anchor moves adjacent anchors in the direction of user control. The original radviz 100 of six dimensions transforms into the customized radviz 102 during user interactive dragging of dimensional anchor 101 in the original radviz 100 to dimensional anchor's 103 position in customized radviz 102 through the arc 104.

Figure 10:
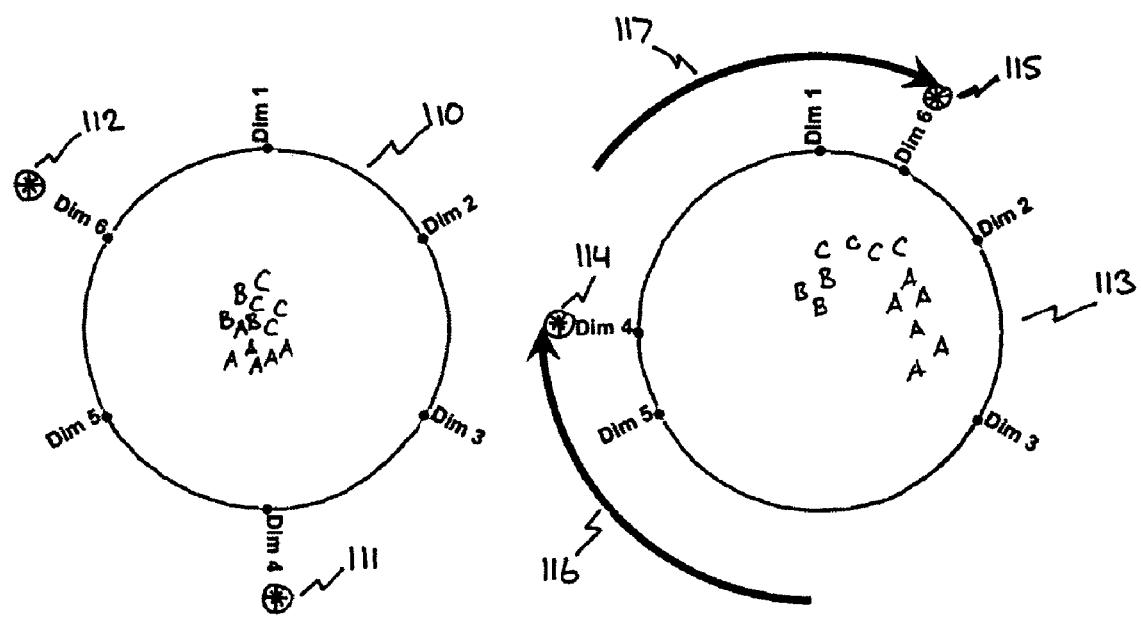
FIG. 10 is an illustration showing the results of using an unbounded interaction operator on the radviz tool.

FIG. 10 shows the results of dynamically moving two dimensional anchors 111 & 112 within a constrained radviz tool 110 using the "unbounded group operator" in which selected dimensional anchors will maintain their relative distances between each other during interactions. This unbounded group operator works in conjunction with interaction operators specified for the previous single manipulated dimensional anchors: overlapping, avoidance, switching, and bounded. The original radviz 110 of six dimensions transforms into the customized radviz 113 during user interactive dragging of dimensional anchors 111 and 112 in the original radviz 110 to dimensional anchor's 114 and 115 positions in customized radviz 113 through the arcs 116 and 117, respectfully.

Figure 11:
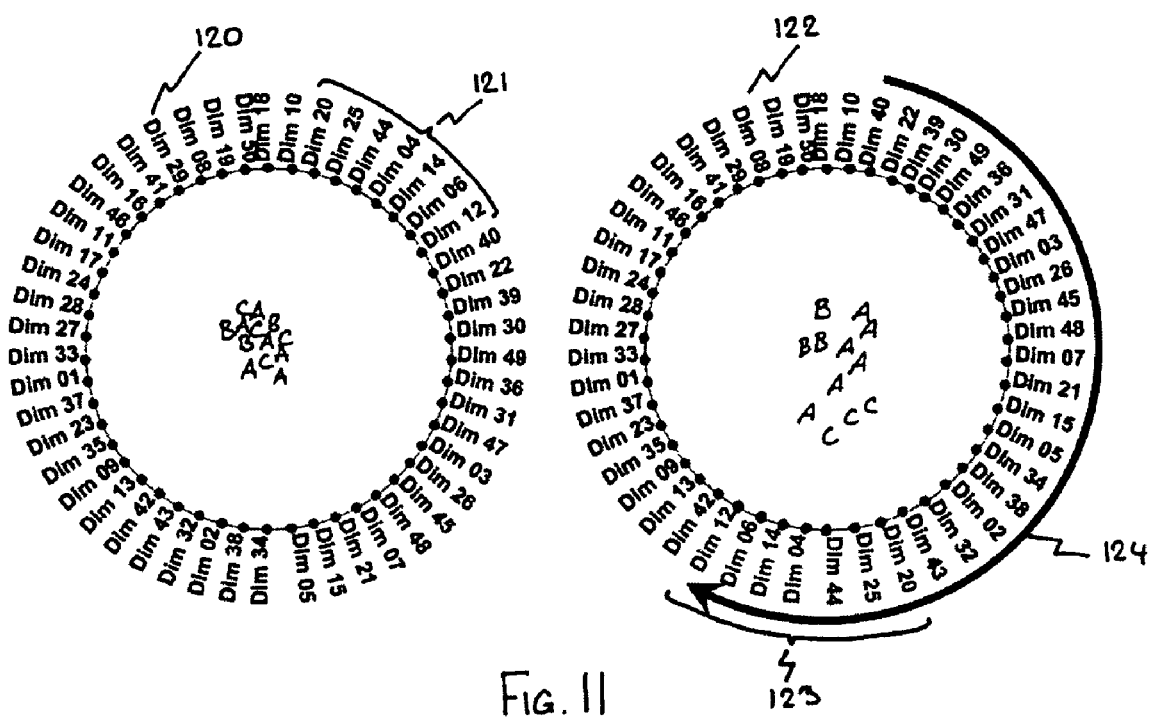
FIG. 11 is an illustration showing the results of using a bounded group operator on the radviz tool.

FIG. 11 shows the results of dynamically moving a group of seven dimensional anchors 121 within a constrained radviz tool 120 using the "bounded group operator" in which selected dimensional anchors are first brought together, and subsequent interactions are defined by the choice of a single dimensional anchor interaction operator: overlapping, avoidance, switching, and bounded. The original radviz 120 of 50 dimensions transforms into the customized radviz 122 during user interactive dragging of the group of dimensional anchors 121 in the original radviz 120 to the group of dimensional anchor 123 positions in customized radviz 122 through the arc 124.

Figure 12:
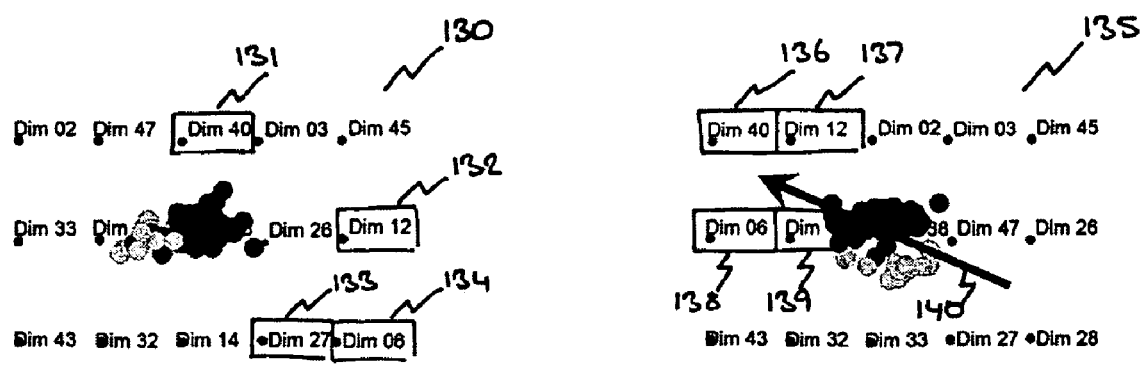
FIG. 12 grid arrangement spring-force based visualization illustration showing the results of using a bounded group and switching interaction operators on the radviz tool.

FIG. 12 shows the results of dynamically moving a group of four dimensional anchors 131, 132, 133 and 134 within a constrained radviz tool 130 using the "bound group and switching interaction operators." The original radviz 130 of four dimensions transforms into the customized radviz 135 during user interactive dragging of the group of dimensional anchors 131, 132, 133 and 134 in the original radviz 130 to the group of dimensional anchor 136, 137, 138 and 139 positions (respectfully) in customized radviz 135 through the arc 140.

In some embodiments the framework 11 implements interactive analytic and visualization techniques based on the record level clustering information to aid in the understanding of the results from clustering with multiple algorithms and parameter settings. The framework 11 changes the focus of cluster analysis from clusters to record migration within clusters. C-dimension stable measure (CDSM) and c-dimension metric (CDM) are implemented and provide a measure of the relationships among particular records and clusters, as they were obtained by a variety of clustering algorithms.

A Cluster Comparator tool set contains interactive visualizations—the Stable Matrix and the Cluster Tree where the users can identify clusters and CDSM groups and outliers using sliders and CDSM record and dimension orders. The framework 11 can identify what points are stable, what groups are stable, which are not, and when these occur in the clustering process.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data, interacting with the analyst, and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

It is to be understood that the foregoing description is intended to illustrate and not to limit the scope of the invention.

What is claimed is:

1. A computer-system having a processor, a memory, and a storage medium, the computer-system being programmed to execute a framework system for connecting a plurality of tools, the framework system comprising:
   a plug-in mechanism configured to dynamically load the plurality of tools;
   a data pool having storage space configured to store data sets associated with the plurality of tools, the data set comprising at least one record with data corresponding to a plurality of dimensions associated with the at least one record;
   a linking mechanism configured to establish communications links between the loaded plurality of tools to enable coordinated operation of the loaded plurality of tools, wherein the coordinated operation generates a visual representation in which a position of the at least one record is computed based on a user-configurable spatial distribution of at least a subset of the plurality of dimensions within the visual representation, wherein the user-configurable spatial distribution is configured by dynamically manipulating the position of one or more dimensions within the visual representation;
   a session component configured to record the process history of the operations of the loaded plurality of tools and the system states corresponding to the process history of the operations; and
   an annotation module configured to associate user-provided data corresponding to one or more of the stored data sets.

2. The framework system of claim 1, wherein the plug-in mechanism is further configured to:
   automatically identify available tools from the plurality of tools;
   maintain a list of the connected plurality of tools; and
   load at least one of the loaded plurality of tools into memory.

3. The framework system of claim 1, wherein the data pool further includes an interface configured to retrieve at least one of: a view, join, graph, dimension, record, count, value, and dimension type.

4. The framework system of claim 1, wherein the linking mechanism includes a memory structure for holding linked collections used to define coordination between loaded tools and data sets.

5. The framework system of claim 1, wherein the session mechanism maintains a memory structure with input/output functionality for maintaining the list of user events and system states supporting branching undo/redo history actions, replay history, and event/state saving.

6. The framework system of claim 1, wherein the user data provided to the annotation module includes at least one of: audio data, graphical data, and video data.

7. The framework system of claim 1, further including an application program interface configured to facilitate development of applications operable on the framework system, and to interface with at least one of: the plug-in mechanism, the linking mechanism, the session component, and the annotation module.

8. The framework system of claim 1, further including a tool program interface configured to facilitate development of dynamically plug-in tools that can be requested and used by the application, and to interface with linked collections.

9. The framework system of claim 1, wherein the data sets are formatted as a table having rows representative of records of the data sets and columns representative of the plurality of dimensions associated with the records.

10. The framework system of claim 9, where at least some of the dimensions of the table are configured to store data objects that are at least one of: non-orderable, orderable, orderable based on measurable characteristics of the data objects, and orderable based on measurable differences between the one or more of the data objects.

11. The framework system of claim 1, wherein the data sets further include metadata descriptors associated with one or more dimensions of data sets, the metadata records being configured to store descriptive information corresponding to the associated dimensions.

12. The framework system of claim 1, wherein the loaded tools include at least one of: a data analysis tool configured to manipulate and modify the data sets, an import and export tool configured to receive and transmit the data sets, and an external interface tool configure to enable the framework system to communicate with other third-party applications.

13. The framework system of claim 1, wherein the user-configurable spatial distribution in the visualization is determined based on an algorithm.

14. A computer program product having encoded thereon computer program tangibly embodied in a machine readable storage device, for implementing a framework system for connecting a plurality of tools, said program including instructions for causing the execution of:
   a plug-in mechanism configured to dynamically load the plurality of tools;
   a data pool having storage space configured to store data sets associated with the plurality of tools, the data set comprising at least one record with data corresponding to a plurality of dimensions associated with the at least one record;
   a linking mechanism configured to establish communications links between the loaded plurality of tools to enable coordinated operation of the loaded plurality of tools, wherein the coordinated operation generates a visual representation in which a position of the at least one record is computed based on a user-configurable spatial distribution of at least a subset of the plurality of dimensions within the visual representation, wherein the user-configurable spatial distribution is configured by dynamically manipulating the position of one or more dimensions within the visual representation;
   a session component configured to record the process history of the operations of the loaded plurality of tool and the system states corresponding to the process history of the operations; and
   an annotation module configured to associate user-provided data corresponding to one or more of the stored data sets.

15. The computer program product of claim 14, wherein the instructions for causing the execution of the plug-in mechanism comprise instructions for causing the plug-in mechanism to:
- automatically identify available tools from the plurality of tools;
- maintain a list of the connected plurality of tools; and
- load at least one of the loaded plurality of tools into memory.

16. The computer program product of claim 14, wherein the instructions for causing the execution of the data pool further comprise instructions for providing an interface configured to retrieve at least one of: a view, join, graph, dimension, record, count, value, and dimension type.

17. The computer program product of claim 14, wherein the instructions for executing the linking mechanism include instructions for implementing a memory structure for holding linked collections used to define coordination between loaded tools and data sets.

18. The computer program product of claim 14, wherein the instructions for causing the execution of the session mechanism comprise instructions for maintaining a memory structure with input/output functionality for maintaining the list of user events and system states supporting branching undo/redo history actions, replay history, event/state saving, and analysis.

19. The computer program product of claim 14, wherein the computer program further includes instructions for generating an application program interface configured to facilitate development of applications operable on the framework system, and to interface with at least one of: the plug-in mechanism, the linking mechanism, the session component, and the annotation module.

20. The computer program product of claim 14, wherein the computer program further includes instructions for generating a tool program interface configured to facilitate development of dynamically plug-in tools that can be requested and used by the application, and to interface with linked collections.

21. The computer program product of claim 14, wherein the instructions for causing the execution of a data pool comprise instructions for storing data sets that include metadata descriptors associated with one or more dimensions of data sets, the metadata records being configured to store descriptive information corresponding to the associated dimensions.

22. The computer program product of claim 14, wherein the user-configurable spatial distribution in the visualization is determined based on an algorithm.

* * * * *